United States Patent
Cai

(10) Patent No.: US 6,582,743 B2
(45) Date of Patent: Jun. 24, 2003

(54) DEVICE AND METHOD FOR COOKING AND/OR HEATING COMESTIBLES WITH HOT GASEOUS FLUID

(76) Inventor: Edward Cai, 4767 NW. Jeanice Pl., Corvallis, OR (US) 97330

(*) Notice: Subject to any disclaimer, the term of this patent is extended or adjusted under 35 U.S.C. 154(b) by 0 days.

(21) Appl. No.: 09/871,453

(22) Filed: May 31, 2001

(65) Prior Publication Data

US 2002/0178932 A1 Dec. 5, 2002

(51) Int. Cl.$^7$ ................................................ A47J 27/04
(52) U.S. Cl. ...................... 426/510; 426/511; 426/519; 426/523; 99/323.1; 99/323.3; 99/474; 99/516
(58) Field of Search ........................... 99/330, 331, 472, 99/474, 483, 516, 288, 293–294, 323.1–323.3, 444, 446; 426/112–114, 523, 519, 510–511

(56) References Cited

U.S. PATENT DOCUMENTS

| | | | |
|---|---|---|---|
| 950,844 A | * 3/1910 | Dolan | |
| 1,524,623 A | * 1/1925 | Iandrum et al. | |
| 2,593,770 A | * 4/1952 | Kollsman | 261/64 |
| 3,232,214 A | * 2/1966 | Aske | 99/340 |
| 3,603,240 A | * 9/1971 | McCarthy | 99/251 |
| 4,164,964 A | * 8/1979 | Daniels | 141/329 |
| 4,233,891 A | * 11/1980 | Schindler et al. | 99/348 |
| 4,342,710 A | * 8/1982 | Adolfsson et al. | 261/121 R |
| 4,495,932 A | 1/1985 | Bratton | 126/20 |
| 4,617,908 A | 10/1986 | Miller et al. | 126/20 |
| 4,635,812 A | * 1/1987 | Mueller | 220/70 |
| 4,649,811 A | 3/1987 | Manganese | 99/417 |
| 4,739,698 A | 4/1988 | Allaire | 99/410 |
| 4,803,920 A | * 2/1989 | Kowalics et al. | 99/348 |
| 4,897,525 A | 1/1990 | Hirsch | 219/401 |
| 5,097,753 A | 3/1992 | Naft | 99/341 |
| 5,215,000 A | * 6/1993 | Desage et al. | 99/331 |
| 5,287,798 A | 2/1994 | Takeda | 99/413 |
| 5,404,803 A | 4/1995 | Glucksman | 99/473 |
| 5,427,816 A | * 6/1995 | Harlaux et al. | 426/614 |
| 5,442,997 A | * 8/1995 | Branz et al. | 99/330 |
| 5,631,033 A | 5/1997 | Kolvites | 426/233 |
| 5,638,740 A | 6/1997 | Cai | 99/295 |
| 5,653,161 A | 8/1997 | Nopanen et al. | 99/415 |
| 5,794,525 A | 8/1998 | Fan | 99/413 |
| 5,816,139 A | 10/1998 | Scorta Paci | 99/413 |
| 5,865,104 A | 2/1999 | Sham et al. | 99/417 |
| 5,943,472 A | * 8/1999 | Charles et al. | 392/396 |
| 5,989,608 A | * 11/1999 | Mizuno | 426/113 |
| 6,076,452 A | 6/2000 | Dessuise | 99/410 |
| 6,293,187 B1 | * 9/2001 | Zils | 99/323.1 |

* cited by examiner

Primary Examiner—Keith Hendricks
Assistant Examiner—Drew Becker

(57) ABSTRACT

Device for cooking food directly in a dish includes a generator for producing hot gaseous fluid, an applicator having a body for covering the dish, an inlet connected to generator for receiving hot gaseous fluid, a seal plate for sealing to the rim of dish to create a closed cooking chamber and a distributor for distributing hot gaseous fluid to food, and an arrangement for allowing the applicator to move upwards and downwards from and to the rim of dish during cooking process to modulate the cooking pressure for the food. Method of use comprises forming a closed cooking chamber between the applicator and dish, increasing the pressure therein to a predetermined pressure, maintaining the predetermined pressure for a period of time and superimposing numerous pressure pulses upon the predetermined pressure for more effective cooking.

17 Claims, 5 Drawing Sheets

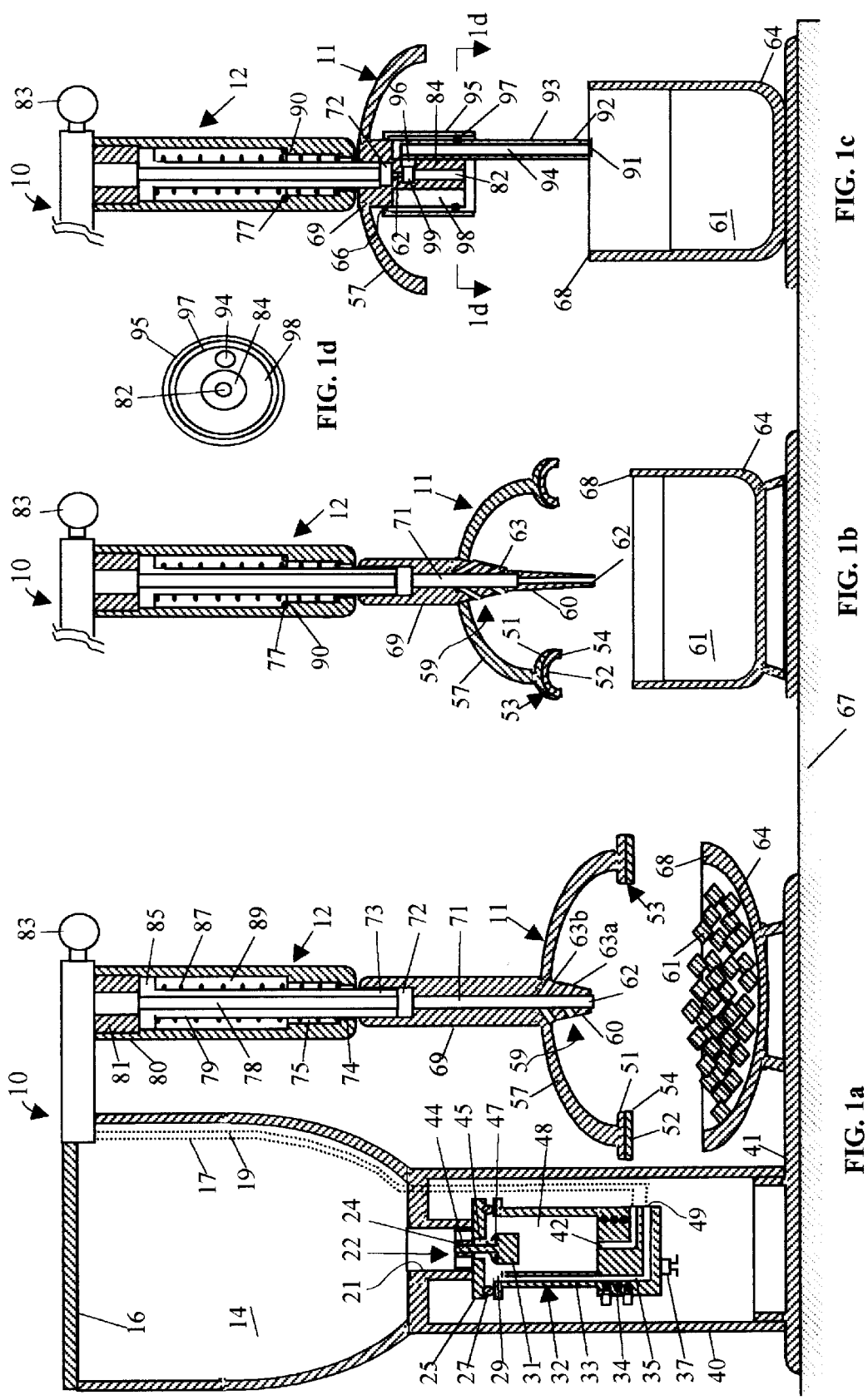

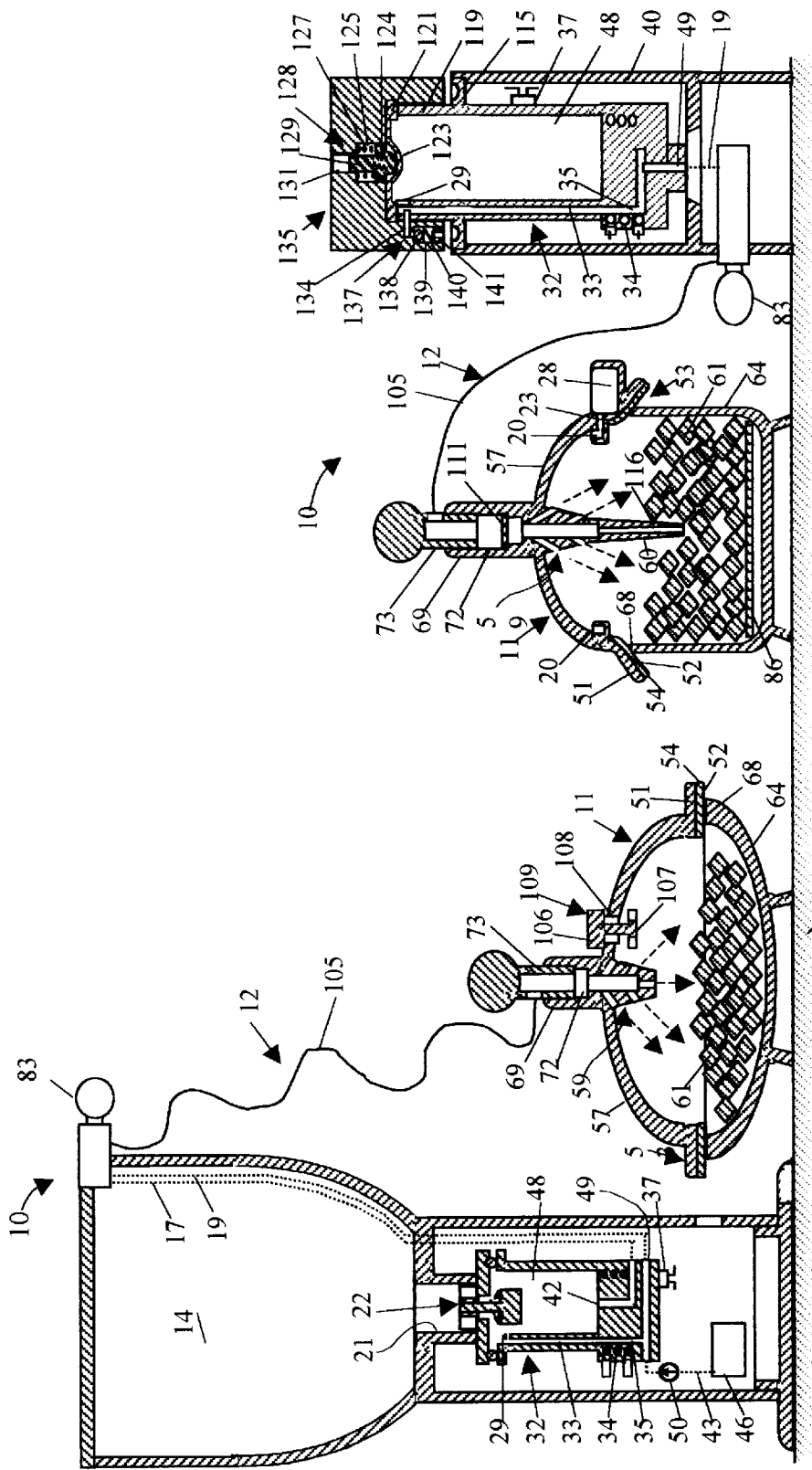

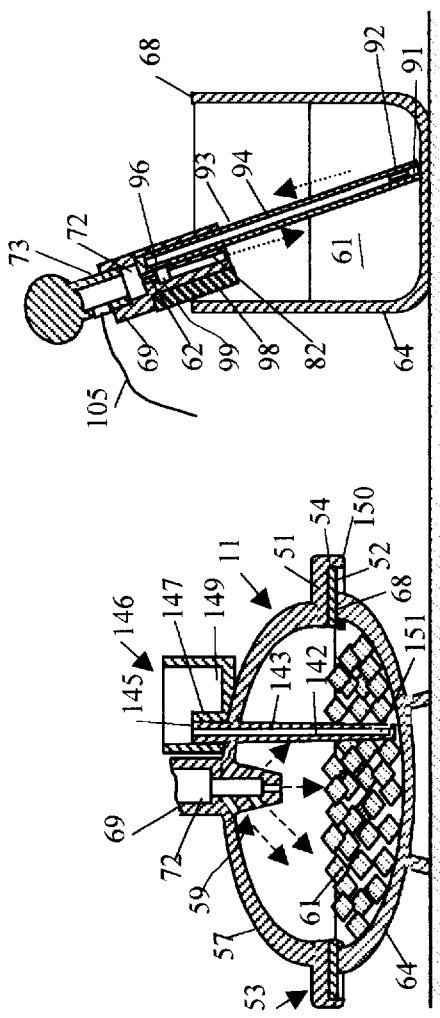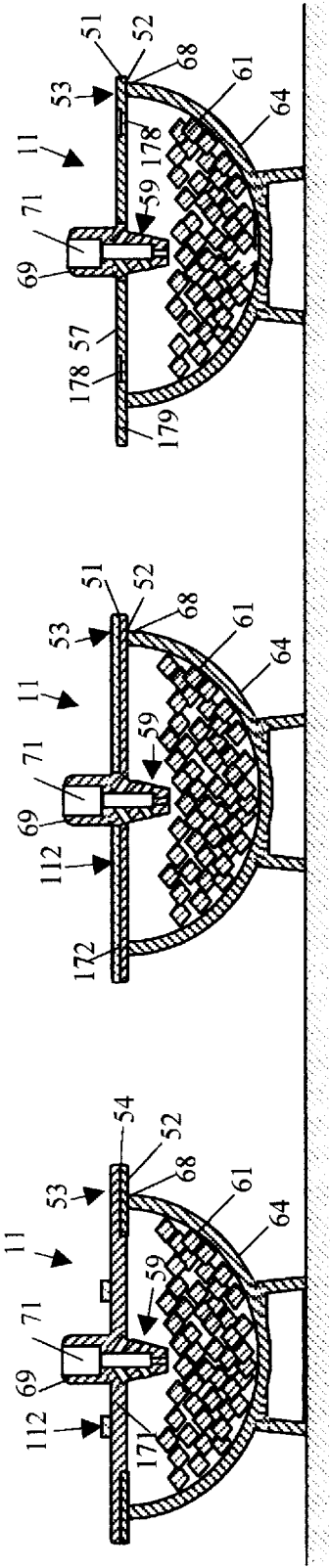

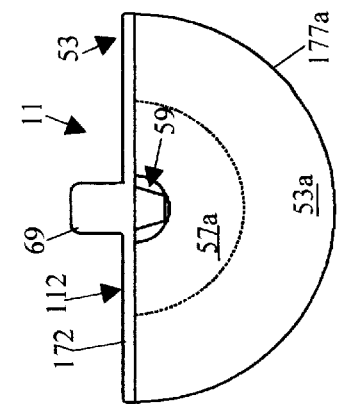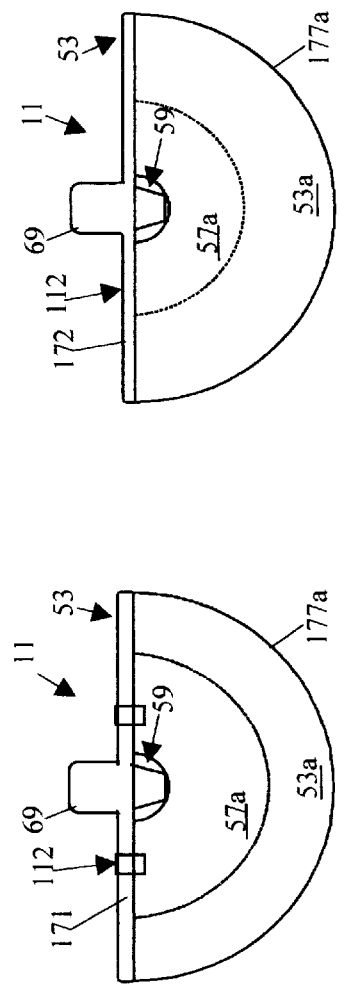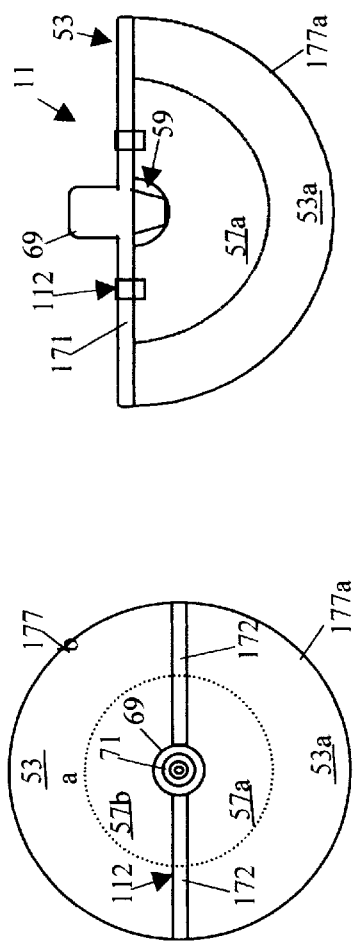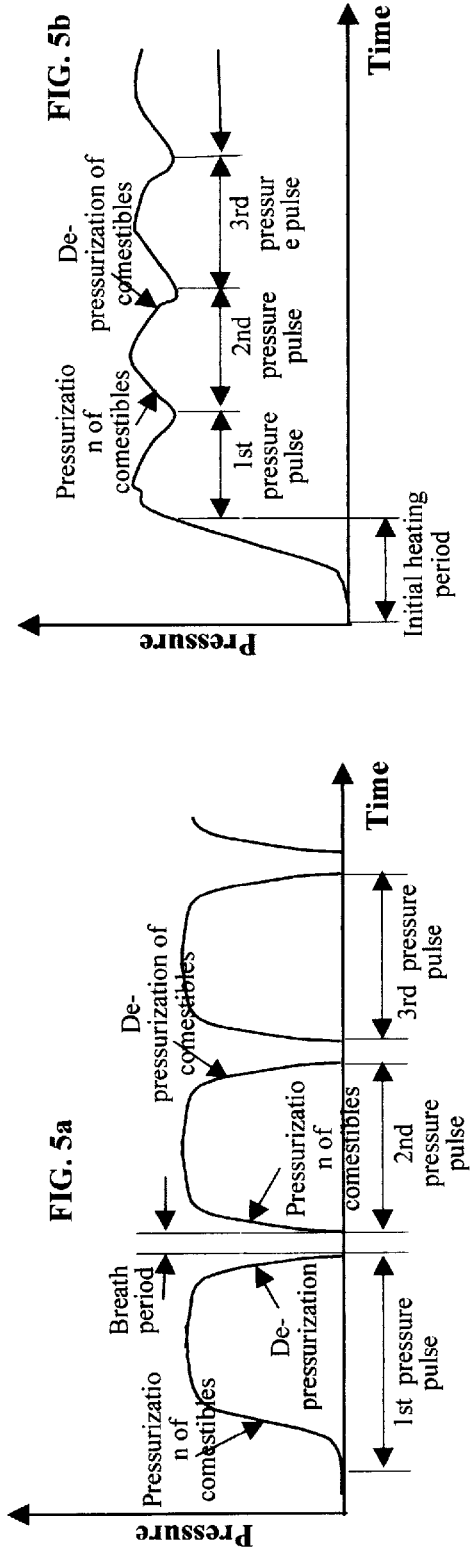

DEVICE AND METHOD FOR COOKING AND/OR HEATING COMESTIBLES WITH HOT GASEOUS FLUID

FIELD OF THE INVENTION

The present invention relates to a device and method for cooking and/or heating comestibles, including solid food such as vegetables, meat, sandwiches, pasta, bread and rice and liquid food such as soup, milk, alcoholic, non-alcoholic drinks or any mix of solid and liquid comestibles. Particularly, the present invention relates to a device and method for cooking or heating comestibles directly in a dish such as a plate, bowl, cup, platter or serving bowl with hot gaseous fluid such as pressurized steam, hot air or their mix.

BACKGROUND OF THE INVENTION

Today, cooking is mostly done with stoves/pans due to their versatility in preparing most comestibles including solid food (vegetables, meat, pasta, sandwiches, rice, etc.) and liquid food (soup, etc.), while heating of comestibles is mostly done with microwave ovens due to their speed and convenience. The well-known drawbacks with stoves/pans include the need for cooking oils, which is considered unhealthy by some people, the damage of vitamins and other crucial nutrients by the high heat and the tedious cleaning of the stoves and pans after the cooking. The well-known drawbacks for microwave ovens include the partial hardening or drying of the comestibles due to non-uniform heating, generally unfavorable taste, and frequent overflow when liquid food such as soup or milk is heated.

Steam devices are slowly gaining popularity since they provide uniform, well-controlled heating/cooking temperatures and requires no cooking oils. Existing steam devices, however, are too complex for most consumers to set up prior to and to disassembly after the cooking and/or heating the food. Furthermore, after the meal the consumers have to clean the numerous components of the device, which normally include a cooking basket for holding food, a cooking container to receive the cooking basket, a water container/boiler for supplying steam, a condensate collector if the condensate is not to be re-boiled and a removable lid, in addition to the dishes (e.g. plates, bowls, cups, platters and serving bowls) the user or consumer use to serve or eat the meal. Examples of such steam devices are described in U.S. Pat. No. 6,076,452 to Dessuie, U.S. Pat. No. 5,865,104 to Sham, U.S. Pat. No. 5,816,139 to Scorta, U.S. Pat. No. 5,794,525 to Fan, U.S. Pat. No. 5,653,161 to Nopanen, U.S. Pat. Nos .5,631,033, 5,404,803 to Glucksman, U.S. Pat. No. 5,287,798 to Takeda, U.S. Pat. No. 5,097,753 to Naft, U.S. Pat. No. 4,897,525 to Hirsch, U.S. Pat. No. 4,739,698 to Allaire, U.S. Pat. No. 4,649,811 to Manganese, U.S. Pat. No. 4,617,908 to Miller and U.S. Pat. No. 4,495,932 to Bratton.

Thus, it is highly desirable for the users or consumers to have a device and method that provide uniform, well-controlled heating/cooking temperatures and requires no cooking oils, that are very easy to set-up and to disassembly, and that requires no cleaning work after the cooking or heating of comestibles.

SUMMARY OF THE INVENTION

A device for preparing comestibles with hot gaseous fluid such as steam, steam/hot air mixture or hot air directly in a dish is provided. The device includes a body comprising a generally gas-impermeable plate having a lower surface adapted to face the comestibles in a dish and an upper surface opposite to the lower surface, a hot gaseous fluid inlet located on the upper surface of the body for communicating with a generator capable of generating the hot gaseous fluid at sufficient pressure to deliver the hot gaseous fluid, and a seal plate located around the generally gas-impermeable plate of the body and having a lower surface adapted to engage with the top or rim of the dish to prevent the hot gaseous fluid from escaping from the interface between the seal plate and dish, thereby creating a substantially closed cooking or heating chamber for the comestibles in the dish. Also included is a distributor located at or near the lower surface of the body and connected to the hot gaseous fluid inlet for distributing the hot gaseous fluid into the substantially closed cooking or heating chamber, causing the comestibles to be cooked or heated in or on the dish directly. The distributor comprises a plurality of orifices configured to convert the pressurized hot gaseous fluid from the generator into a plurality of jets to inject onto or into the comestibles in the dish at sufficient speed to create a turbulent environment in the substantially closed cooking or heating chamber for more uniform cooking or heating. By cooking or heating comestibles directly in a dish with the hot gaseous fluid, the device allows a user to serve or consume the prepared comestibles in the same dish, therefore greatly simplifying the meal preparation as well as relieving the user from the tedious cleaning work after the cooking.

The body of the device adopts a generally cone or dome shape with a condensation collector such as a trough around its lower peripheral to collect the water condensation formed on the lower surface of the body. The condensation can also be removed by a storing chamber and a conduit having one end connected to the storing chamber and another end adapted to insert into the comestibles to allow the presence of a very small pressure in the dish to force the condensation into the storing chamber. The lower surface of the seal plate is adapted to be dynamically or reversibly engaged with the top or the rim of the dish in a first embodiment of the invention, and to be peelably sealed by heat staking or adhesive to the top or the rim of the dish in a second embodiment, to enclose the comestibles in the dish. The device according to the first embodiment further includes a folding mechanism to allow the body and seal plate to be folded to reduce the device size, thereby facilitating the transportation or storage of the device. The generator comprises a generator inlet for gaseous fluid or water, a superheating channel for evaporating the water from the inlet and for heating the gaseous fluid to a sufficiently high temperature for cooking or heating the comestibles in the dish, and a generator outlet connected to the hot gaseous fluid inlet.

The device also includes an extendable member having a member inlet connected to the generator outlet and a member outlet connected to the hot gaseous fluid inlet on the upper surface of the body for allowing a user to move the body between a rest position, in which the body is close to the member inlet, and an operating position, in which the body is relatively farther away from the member inlet. In one embodiment, the extendable member further comprises a sliding chamber connected to the member inlet, a piston adapted to fit slidingly in the sliding chamber, an elongated cylinder connected to the piston and having a through-channel for the hot gaseous fluid, an upper end in communication with the member inlet and a lower end at which the member outlet is located, and a spring for pushing the piston upwards in the sliding chamber. In another embodiment, the extendable member further comprises a flexible or coiled tube having a first end at which the member inlet is located and a second end at which the member outlet is located.

Another aspect of the invention is a method for preparing comestibles with hot gaseous fluid such as steam, steam/hot air mixture or hot air. The method includes placing the comestibles to be prepared in a dish, setting the dish directly below an applicator comprising the body and seal plate or setting the applicator above the dish, and engaging the applicator with the top or the rim of the dish to prevent the hot gaseous fluid from escaping from the interface between the applicator and the dish, thereby forming a substantially closed cooking or heating chamber for the comestibles in the dish. The method also includes introducing the hot gaseous fluid into the substantially closed cooking or heating chamber and distributing the hot gaseous fluid to the comestibles in the dish, thereby cooking or heating the comestibles with the hot gaseous fluid in the dish directly. The next step is to turn off the hot gaseous fluid to the applicator after the comestibles in the dish has been prepared and become ready for serving or consuming and removing the applicator from the top of the dish to make the prepared comestibles in the dish accessible to the user. To improve the efficiency of cooking or heating the comestibles, the step of introducing the hot gaseous fluid comprises a step of delivering a first pressure pulse of the hot gaseous fluid, comprising a pressurization period and a de-pressurization period, to the comestibles in the dish. During the pressurization period, the hot gaseous fluid is forced into the air-spaces and/or microscopic pores in the comestibles by the higher pressure outside the air-spaces and/or microscopic pores, and during the de-pressurization period, the hot gaseous fluid is forced out of the air-spaces and/or microscopic pores in the comestibles by the higher pressure inside the air-spaces and/or microscopic pores, thereby causing the cooking or heating action to occur deep inside the comestibles. The next step is to deliver a second pressure pulse of the hot gaseous fluid, comprising a pressurization period and a de-pressurization period, to the comestibles in the dish. Again, the hot gaseous fluid is forced into the air-spaces and/or microscopic pores in the comestibles during the pressurization period and forced out of the air-spaces and/or microscopic pores in the comestibles during the de-pressurization period, causing the cooking or heating actions to occur deep inside the comestibles. The steps of delivering pressure pulses to the comestibles are repeated until the comestibles has been fully cooked or heated for servicing or consuming.

It is an object of the present invention to provide a device and method for preparing better tasting, healthier solid and liquid food.

It is a further object of the present invention to provide a device and method that are significant easier to use and faster than current cooking/heating appliances including microwave ovens.

It is a still further object of the present invention to provide a device and method that are require little or no cleaning work after preparing the comestibles.

It is a still further object of the present invention to provide a device and method to resolve the overflow problem when liquid food such as soup or milk is heated or cooked.

It is a still further object of the present invention to provide a device and method that allows a user to cook or heat with one or more hot gaseous fluid.

It is a still further object of the present invention to provide a device and method for heating or cooking comestibles uniformly without overheating.

These and other objectives and advantages of the present invention will become apparent from the following description of the preferred embodiments, taken together with the accompanying drawings.

DESCRIPTION OF THE DRAWING

The accompanying drawing illustrates diagrammatically non-limitative embodiment of the invention, as follows:

FIGS. 1a–c are side elevation sectional, partially-schematic views of a first embodiment of the present invention, for preparing comestibles directly in dishes (e.g. plate, bowl and cup) using pressurized steam before the cooking or heating starts;

FIG. 1d is a sectional view along line 1d—1d of FIG. 1c;

FIGS. 3a–b are side elevation sectional, partially-schematic views of two modified versions of the first embodiment of the FIGS. 1a–b of the present invention, for preparing comestibles directly in dishes using hot gaseous fluid after the cooking or heating has started;

FIGS. 4a–e are side elevation sectional, partially-schematic views of modified versions of the applicator 11, for preparing comestibles directly in a dish using hot gaseous fluid;

FIGS. 4f and 4g are top views of the applicators 11 in FIGS. 4c and 4d, respectively;

FIGS. 4h–i are front views of the applicators 11 of FIGS. 4c–d in the folded position, respectively;

FIGS. 5a–b are schematic diagrams showing two exemplary patterns of the pressure pulses used to prepare comestibles.

DETAILED DESCRIPTION OF THE PREFERRED EMBODIMENTS

Figures 2A, 2B, 2C:
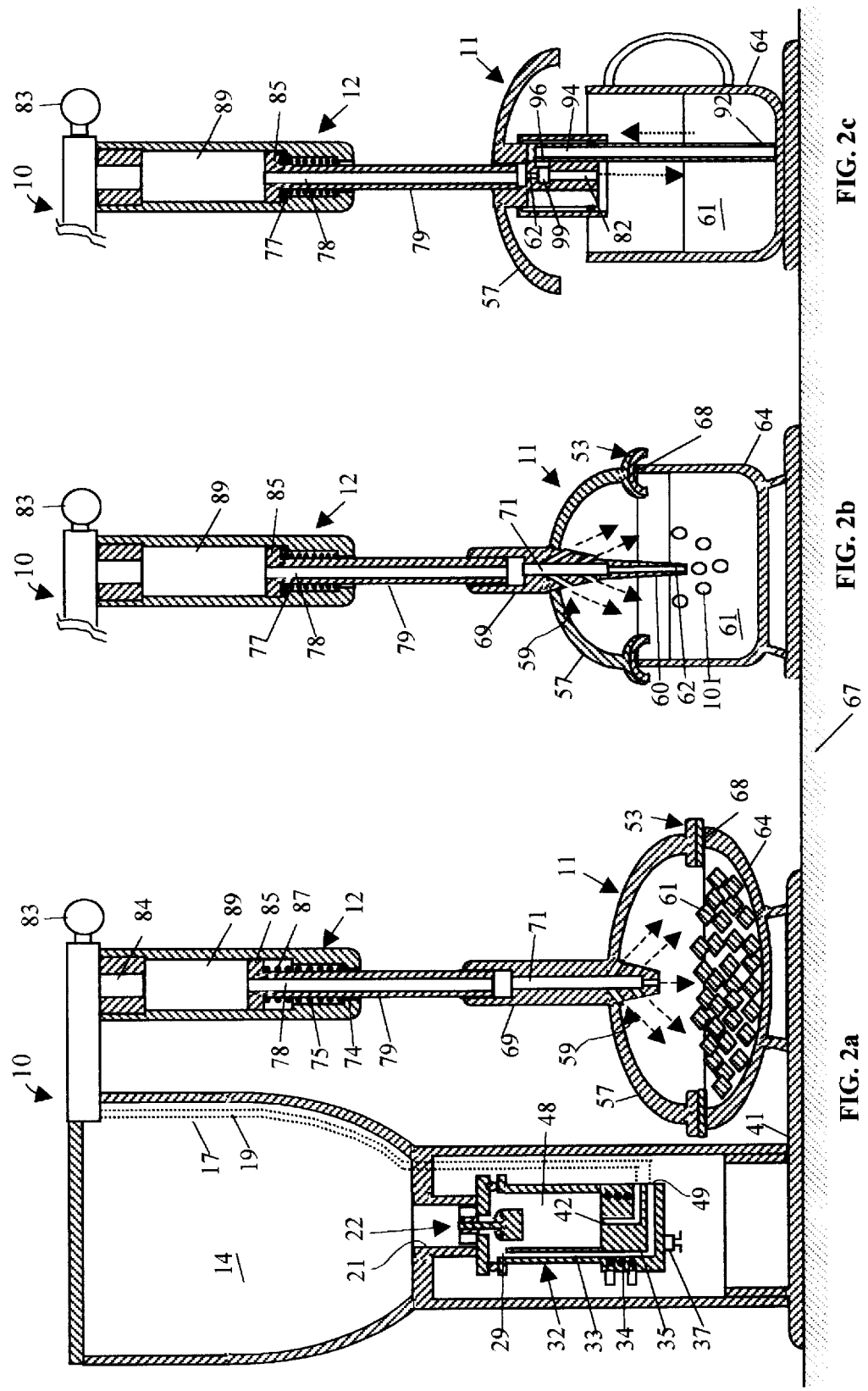
FIGS. 2a–c are side elevation sectional, partially-schematic views of a first embodiment of the present invention shown in FIGS. 1a–c after the cooking or heating has started.

FIGS. 1a–c show certain parts of a device 10 for preparing comestibles 61 directly in a dish 64 with pressurized steam, which embodies one form of the present invention. Only those parts of the device are shown which are necessary for full understanding of the invention. Device 10 comprises a water reservoir 14 having a lid 16 and an outlet 21, a generator 32 for producing pressurized steam, an applicator 11 for applying the pressurized steam to the comestibles 61 in the dish 64, and an extendable member or arm 12 for connecting the applicator to the generator and for automatically moving the applicator to seal against the dish 64 as result of the steam pressure. A valve 83 is located above the extendable arm to allow the adjustment of steam flow rate to the applicator 11 either electronically by the device or manually by the user.

The applicator 11 in FIGS. 1a and 1b each comprises an applicator inlet 69 having a cavity 72 for mounting the applicator to the extendable arm, a dome or cone-shaped applicator body 57, a steam distributor 59 near the center of the applicator body connected to the cavity 72 via a channel 71 for distributing the pressurized steam uniformly to the comestibles 61 in the dish 64, and a seal plate 53 formed or attached to the periphery of the applicator body 57 for forming sufficient seal with the outer edge 68 of the dish 64. The steam distributor comprises a generally cylindrical body 60 with a smaller diameter near the free end, a plurality of orifices 63a and 63b formed on the cylindrical body at predetermined angles so that the steam jets shown as dotted arrows in FIGS. 2a and 2b from the orifices are uniformly distributed onto the comestibles 61 in the dish, and a central orifice 62. The seal plate 53 comprises a rigid plate 51, a gasket 54 attached to the rigid plate and a lower surface 52 for interfacing with the outer edge 68 of the dish 64. In FIG. 1a, the lower surface 52 is generally flat to form a seal with dishes of any shapes such as round, oval, square or rectangle shape. In FIG. 1b, the lower surface 52 is arcuated or V-shaped to restrict any possible lateral movement of the dish after the extendable arm pushes the applicator onto the dish as shown in FIG. 2b. The generally cylindrical body 60 in FIG. 1b is sufficiently long to inject steam via orifice 62 to the comestibles near the bottom of the dish. A check valve (not shown) may be located in the applicator to allow the steam to flow from extendable arm 12 dish 64 but prevent the reverse flow, therefore protecting the extendable arm and generator from potential contamination by the comestibles.

It is appreciated that the applicator 11 may have a vent (not shown) for the hot gaseous fluid in dish 64, thereby causing the comestibles in the dish to be heated or cooked at atmosphere or at slightly above atmosphere pressure. The vent can be a restrictive vent to allow some building up of pressure above the comestibles 61 in the dish. It is also appreciated that the seal between the seal plate 53 and the side wall or rim of the dish 64 does not have to be airtight. In the case of non-airtight seal formed between the seal plate 53 and the side wall or rim of the dish 64, this seal also functions as a vent. It is also appreciated that the distributor 59 can have a plurality of cylindrical bodies 60 to achieve more uniform distribution of the hot gaseous fluid. It is also appreciated that the orifices 62 and 63a–b on the distributor can be replaced by one or more openings that have a slot or other shape. It is also appreciated that the distributor can be replaced by a distribution plate with a plurality of through openings. It is also appreciated that the applicator 11 can have a large applicator body 57 and seal plate 53 to form a seal with the side wall of a first container or dish 64, which is large enough to contain a second dish 64 in which the comestibles 61 is contained. It is also appreciated that the bottom 41 on which the dish 64 sits may be heated by heat conducted from generator 32 or by another heater.

When the comestibles 61 in the dish is liquid, bubbles 101 may be formed in the liquid when the generally cylindrical body 60 is sufficiently long to inject steam via orifice 62 directly into the comestibles (FIG. 2b). Such bubbles help mix the liquid 61 and cause more uniform heating. One drawback with the orifice 62 directly into the liquid is the potential liquid overflow caused by the steam after the liquid becomes sufficiently hot that the steam from the orifice can not condense into water fast enough. Such overflow risk increases if most or all the steam from the generator is injected directly into the liquid via the orifice 62.

The applicator 11 of FIG. 1c solves this above liquid overflow problem by drawing liquid 61 into a mixing chamber 99 via a rigid liquid suction conduit 93 and mixing the liquid 61 with the steam jet from the orifice 62 in chamber 99 to heat the liquid (FIG. 2c), in stead of injecting the steam into the liquid in the dish 64 as shown in FIG. 2b. The flow direction of the liquid 61 is shown by the dotted arrows in FIG. 2c.

The applicator 11 of FIG. 1c comprises the applicator inlet 69 with cavity 72 for mounting the applicator 11 to the extendable arm 12, dome or cone-shaped applicator body 57 and orifice 62 as the applicator of FIG. 1a or 1b. It further comprises the liquid suction conduit 93 for introducing the liquid 61 into the mixing chamber 99, in which the steam from the orifice 62 mixing with the liquid and the resulting hotter liquid is released back into the dish 64 through an outlet channel 82. The orifice 62, mixing chamber 99 and outlet channel 82 are formed in an inner cylindrical body 84 located below the applicator inlet 69. The rigid liquid suction conduit 93 comprises a channel 94 connected to the mixing chamber 99 via an opening 96 formed at the inner cylindrical body 84, a drain opening 91 and a liquid inlet 92. The upper part of the channel 94 is formed in the wall of a middle cylindrical body 98 (FIGS. 1c and 1d). An outer cylinder 95 is fitted slidingly on an o-ring 97 attached to the lower bottom part of the middle cylindrical body 98 and is prevented from sliding out of the middle cylindrical body by a flange 66.

If the outlet channel 82 of the applicator is between about 0.001 inch$^2$ to 0.02 in$^2$ in cross-section area or about 0.04 to 0.1 inches in diameter, foam may be formed in the liquid comestibles 61 in the dish 64. The user can control the amount of foam introduced into the liquid comestibles in the dish 64 by moving the outer cylinder 95 up or down. Normally, the foam level in the dish above the liquid comestibles will be about around the lower edge of the outer cylinder 95. It was found that to cook or heat the liquid comestibles 61 without introducing air bubbles into the comestibles in the dish 64, the size of the outlet channel 82 should be about and preferably larger than 0.08 inches in diameter, depending primarily on the velocity of the steam from the orifice 62 and the other dimensions of the applicator.

In the exemplar embodiments (FIGS. 1–4), the applicator 11 is made from materials that are safe when in contact with food. To facilitate the cleaning, the materials used to construct the applicator can be dishwasher washable. The applicator body 57 can be made from transparent materials such as glass or plastics to allow the user to observe the comestibles during the cooking or heating process. It can adopt other shapes to fulfill the cover function and be made relatively thick with heat-insulating materials to reduce steam condensation on its under surface. To further reduce steam condensation, the applicator body may comprise a layer of air or vacuum space sandwiched between two layers of glass, metal, plastics, ceramics or porcelain.

The dish 64 to be used with the applicator 11 can be a dish from a place setting (dinner plate, salad plate, bowl, cup, etc.) or from a completer set (platter, serving bowl, pitcher, etc.). The applicator 11 allows the user to choose a large dish when a large amount of comestibles is to prepared or select a small dish when a small amount of comestibles is to prepared, therefore reducing energy waste and shorten the time needed for cooking or heating. The dish 64 can also be other type of containers available in a user's kitchen or provided with the device as long as the top of the side wall or the rim of the container can form a substantially air-tight seal with the lower surface 52 of the seal plate 53. To reduce steam condensation in the dish to be used with the applicator 11, it is recommended for the users to choose the dish that is made from poor heat conducting materials such as glass, ceramic, porcelain, earth, plastics or wood. The comestibles to be prepared (e.g. cooked, heated or sterilized) in the dish 64 can be any solid food or combinations such as vegetables, meat, pasta, rice or other grains, spaghetti, noodle, bread, rolls, sauce, pizza, sandwich, an assortment of food people selected in a buffet, restaurant or parties or any liquid food such as soup, milk, baby formula, fruit drinks, alcohol and non-alcohol drinks.

The generator 32 comprises a chamber 48 for receiving an amount of water from the reservoir 14, a cover 25 sealed to the chamber 48 by a gasket 27 and attached to the outlet 21 of the reservoir 14, a steam heating channel 33 for further heating the steam before it is delivered to the applicator 11 to reduce the amount of liquid water and steam condensation that may fall onto the comestibles in the dish 64, a heater 34 for heating the water and producing steam in the chamber 48, a thermal control device such as thermostat to control the temperature of the generator, and a check valve 22 for preventing the flow from the chamber 48 to the reservoir 14 and for filling the chamber with water from the reservoir after the steam pressure in the chamber has decreased to a certain value. The generator is located in a housing 40 below the water reservoir and closed by the bottom cover 41. The chamber 48 can be designed to contain small amount of water if it is desired for the device to start producing steam quickly after it is turned on.

The heating channel 33 comprises a steam inlet 29 located at the top portion of the chamber 48 for introducing steam into the channel, a super-hot section 35 of the channel located near the heater 34 and a steam outlet 49 connected to a valve 83 by a steam passageway 19. Besides heating the steam to a temperature sufficiently higher than 100° C., the super-hot section 35 also prevents liquid water from entering the heating channel since as liquid water reaches the super-hot section the steam pressure inside the channel will increase to above the pressure in the chamber 48. It is theorized that this pressure difference prevents further introduction of liquid water into the heating channel until the difference disappears as the steam is delivered to the applicator. The temperature in part of the heating channel can be high enough to heat the steam or other gas such as air or air-steam mixture to a temperature as high as over 200° C. Such high steam or gas temperature reduces the cooking/heating time needed, reduces the steam condensation, and possibly improves the taste and flavor of the comestibles prepared by the device or applicator 11.

A water outlet 42 is formed at the bottom of the chamber 48 and is connected to the valve 83 via liquid passageway 17. The water outlet 42 and passageway 17 is intended for two purposes. One purpose is to produce hot water for direct use or for making coffee, tea, espresso or other drinks by connecting a coffee cartridge or brew basket to the applicator 11 or mounting head 73. The other is for de-scaling, i.e. for removing mineral deposits and salt, in the chamber 48 and the rest of the system. To de-scale, a de-scaling solution such as vinegar is added into the reservoir 14 and the valve 83 is turned to connect the liquid passageway 17 to the applicator to deliver the vinegar solution through the system.

The steam inlet 29 can be located at the lower part or even at the bottom of the chamber 48 if the heating channel 34 is effective enough to convert the liquid water to steam prior to reaching the steam outlet 49. With the steam inlet 29 located at or near the bottom of the chamber, hot water may be delivered to the applicator through the heating channel 33 and the steam passageway 19, and as a result the water outlet 42 and water passageway 17 can be removed from the device. To produce hot liquid water through the heating channel 33 and the steam passageway 19, chamber 48 is heated to a certain temperature and the heater 34 is then turned off. The remaining heat in the chamber produces sufficient steam to force the hot water in the chamber out of heating channel 33 and steam passageway 19 to the applicator or a coffee cartridge or brew basket connected to the mounting head 73 or the applicator. Hot water may also be produced to the applicator through the steam passageway 19 by turning on and off the heater 34 periodically or intermittently. By locating the steam inlet 29 of the heating channel 33 near or at the bottom of the chamber 48, two unexpected benefits are observed. The first benefit is the reduced scale (calcium carbonate, salt, etc.) formation in the chamber. The second benefit is the ability to remove the scale or mineral deposit, to se-scale, in the whole system, including the chamber 48, heating channel 33, steam passageway 19 and the extendable arm 12. To de-scale the whole system, the user pours de-scaling solution such as diluted vinegar into reservoir 14 and delivering the solution out of the steam inlet 29, which is now located at or near the bottom of the chamber 48, and through heating channel 33, steam passageway 19, the extendable arm 12 and the applicator.

It is appreciated that the heater 34, chamber 48 and heating channel 33 can be constructed in numerous other configurations. One example (not shown) of the other configurations is that the heater 34 and at least part of heating channel 33 are located in one metal block with the heating channel located on the top surface of the metal block. The bottom of the chamber 48 is mounted onto the top surface of the metal block to connect the heating channel at the metal block to the steam inlet 29 in the chamber 48. In another example, the heating channel may be formed as a separate part with its own heater, and may be located somewhere in the housing 40 that is located below the reservoir 14 or located adjacent to the extendable arm 12. One unexpected benefit of locating the heating channel 33 adjacent to the extendable arm is that the extendable arm can be warmed up by the heater for the heating channel, thus reducing the steam condensation prior to the applicator. It is further appreciated a steam buffer chamber may be formed somewhere in the heating channel 33 to trap any liquid in the steam.

The check valve 22 comprises a disc 31 of certain weight, a seal disc 47, a keeper 24 located above the cover 25, an opening 45 formed in the cover 25, and a stem 44 for connecting the disc 31 to the keeper 24. The check valve is open to allow water in reservoir 14 to flow into chamber 48 when the pressure in the chamber is below a certain value, and is closed when the pressure reaches above the certain value. The certain value is determined primarily by the water level in the reservoir 14, the mass and density of the various parts of the check valve, and the area of the opening 45.

It is appreciated that other generators can be used to replace the generator 32 of FIG. 1a. One example (not shown here) of such other generators comprises a heating block having a heating channel and a mechanical pump to deliver water from a water reservoir to the heating channel wherein the water is evaporated to produce the pressurized steam needed for the applicator 11. Another example (not shown) comprises a boiler chamber and a mechanical pump to deliver water from a water reservoir to the boiler chamber to produce the pressurized steam. Another example comprises a chamber for containing an amount of water and adapted to fit above a heater on a stove or cooktop to produce pressurized steam for the applicator 11 and a lid 135 for closing the chamber. Another example comprises chamber 48 for containing an amount of water, heater 34 for heating the water to generate pressurized steam for the applicator 11, and a lid 135 for closing the chamber as shown in FIG. 3b and will be discussed further later in this disclosure.

The extendable member or arm 12 comprises an arm inlet 80 for connecting the extendable arm to steam conduit 81 connected to valve 83, a sliding chamber 89, a piston 85 adapted to fit slidingly in the sliding chamber, an elongated cylinder 79 having a channel 78 connected to the piston 85 and a member outlet or mounting head 73 adapted to connect to the applicator 11, a spring 87 for retracting the elongated cylinder 79 into the sliding chamber 89, a spring chamber 75 having a bottom opening 74 to support and maintain the spring above the bottom opening 74 and for communicating with atmosphere. To reduce the steam leakage through the gap between the piston 85 and sliding chamber 89, the diameter of the piston and sliding chamber are preferred be as closely the same as possible to reduce the gap. The materials used for the piston and sliding chamber preferably have very small thermal expansion coefficients to prevent any significant changes in diameter. To reduce the cooling condensation of the steam within the extendable arm, the elongated cylinder 79, spring chamber 75 and even sliding chamber 89 are preferably made from low heat-conducting materials. A heat insulation cover may be used for the spring chamber and sliding chamber to reduce the steam cooling therein and make the extendable arm relatively cool when the users touch it. The channel 78 and the passageway for the gaseous fluid in applicator 11 are dimensioned to allow sufficient pressure drop therein so that the piston 85, thus the elongated cylinder 79 and applicator 11, can be pushed down against the spring 87 by the pressure drop.

It is appreciated that the extendable arm 12 can be adapted to accept a plurality of different applicators 11 such as those shown in FIGS. 1a–1c, 3a, 3b and 4c–d. It is also appreciated that the extendable arm 12 is adopted to accept only type of applicator 11 if the device 10 is intended for specialized applications. It is also appreciated that to ensure no steam leakage at the extendable arm 12, an o-ring or gasket 77 may be placed at the shoulder 90 above the spring chamber 75 (FIGS. 1a–c and 2a–c).

To use the device 10, the user simply places the dish 64 with comestibles 61, which dish is a plate in FIG. 1a, a bowl in FIG. 1b and a cup in FIG. 1c, under the applicator 11 and turns on the device. After the device is turned on, the water in the chamber 48 is heated by heater 34 to produce pressurized steam. The pressurized steam is delivered via heating channel 33 and steam passageway 19 to extendable arm 12 and pushes the piston 85 and elongated cylinder 79 downward, which in turn pushes the applicator 11 connected to the lower end of the elongated cylinder 79 downward until the seal plate 53 reaches the rim 68 of the dish 64 or the rigid liquid conduit 93 reaches the bottom of the dish 64 (FIGS. 2a–c). The steam is injected into the comestibles 61 in the dish by the steam distributor 59 (FIGS. 2a and 2b) or into the liquid sucked into the mixing chamber 99 by the vacuum produced by the orifice 62 (FIG. 2c). It is noted that when the pressure in the dish 64 of FIGS. 2a–b reaches above a certain pressure, the applicator is pushed upward and away from the top of the side wall or rim 68 of the dish by the pressure in the dish, causing the steam therein to be released periodically. This may result in the pressure on the comestibles 61 to change periodically, i.e. produce small pressure pulses, which may improve the quality of the resulting comestibles. After the preparation (e.g. cooking, heating or sterilizing) of the comestibles 61 has been completed, the user simply turns off the steam or device or the device is automatically turned of by timer (not shown) in the device, which causes the applicator 11 to be retracted upwards by the spring 87, therefore allowing the user to access the dish 64 freely. In the case of FIGS. 2b and 2c, the liquid in the cylindrical body 60 or conduit 92 drains back into the dish as the applicator 11 moves up.

The steam flow to the applicator 11 or the power to the heater 34 can be electronically or electrically controlled to more efficiently cook or heat the comestibles 61 in dish 64. For example, the power to heater 34 or the steam flow to the applicator 11 at the beginning of a cooking cycle can be set higher to heat the comestibles 61 in the dish 64 more rapidly to the desired cooking temperature, and be subsequently reduced to maintain the cooking temperature to save electricity and reduce steam condensation. After the comestibles 61 has been cooked or heated, the power to heater 34 or the steam flow to the applicator 11 can be further reduced to a level to keep the comestibles warm in the dish 64. The device may further comprise a timer to allow the user to set a cooking or heating time. The timer automatically turns off the device or turns down the power to heater 34 or the steam flow to the applicator 11 after the preset cooking or heating time. Liquid water may be automatically applied to the comestibles 61 in the dish by the applicator to wet or soak the comestibles prior to or during the application of the hot gaseous fluid.

The pressure applied to the comestibles 61 by the applicator 11 can be generally constant during the preparation process or vary according to a predetermined pattern. We found that the cooking and heating results for the comestibles 61 could be improved when the pressure applied to or acted on the comestibles 61 in dish 64 of FIGS. 1a and 1b was varied according to predetermined patterns, such as those shown in FIGS. 5a and 5b. The pressure applied to the comestibles 61 in the dish 64 can be from pressurized hot steam, hot air or a mixture of hot steam and hot air. The pressure pattern of FIG. 5a may be achieved by at least four different methods with the device 10.

The first method including steps of filling the chamber 48 with water from the reservoir 14 through check valve 22, heating the water in the chamber 48 to generate steam, delivering the steam to the extendable arm 12 and applicator 11, covering and sealing the dish 64 as the steam pressure in the extendable arm pushes the piston 85 thus the applicator 11 downwards to the dish, injecting the steam to the comestibles to cook, heat or sterilize the comestibles, releasing excess steam in the dish 64 when the steam pressure therein reaches above a certain pressure, and retracting the applicator from the dish 64 as the water in the chamber 48 dried out and the steam pressure above the piston 85 decreases. The certain pressure is primarily determined by the size of dish 64 used, the pressure drop in extendable arm 12 and applicator 11, the strength and the degree of compression of spring 87, the size of piston 82, etc. The above steps generate the first steam pressure pulse acted on the comestibles 61 in the dish 64 as shown in FIG. 5a. After the steam pressure in the chamber 48 reaches a certain value, the check valve 22 opens and causes the chamber 48 to be filled with water from the reservoir again. The steps for generating the first steam pressure pulse are repeated to produce the second steam pressure pulse acted on the comestibles 61 in the dish 64 as shown in FIG. 5a. Similarly, a third and more steam pressure pulses can be produced.

Each of the steam pressure pulses acted on the comestibles in dish 64 has a pressurization period during which hot steam is forced into the comestibles 61 to heat or cook the comestibles and a de-pressurization period during which the steam flows out of the comestibles. The breath period between two steam pressure pulses are the period during which the applicator is retracted away from the dish 64 by the piston 85, i.e. during which the comestibles 61 in the dish is open to atmosphere. It is noted the first pressure pulse has a more gradual start up than the later ones probably because the chamber 48 is cold before the first steam pressure pulse while the chamber 48 is hot before the second and later pressure pulses.

One theory for explaining the better cooking or heating results is that these repeated pressurization and de-pressurization enhances the contact of the comestibles on both top and bottom of the dish with the hot steam. It is also theorized that the repeated pressurization and de-pressurization force the hot gaseous fluid such as hot steam repeatedly into and out of the air-spaces, pores or microscopic pore in the comestibles 61.

The second method to generate the steam pressure pulses acted on the comestibles in the dish 64 as depicted in FIG. 5a include steps of filling the chamber 48 with water from the reservoir 14 through check valve 22, heating the water in the chamber 48 to generate steam, delivering the steam to the extendable arm 12 and applicator 11, covering and sealing the dish 64 as the steam pressure in the extendable arm pushes the piston 85 thus the applicator 11 downwards to the dish, injecting the steam to the comestibles to cook, heat or sterilize the comestibles, releasing excess steam in the dish 64 when the steam pressure therein reaches above a certain pressure, turning off the heater 34 by thermal controller 37, and retracting the applicator from the dish 64 as the water in chamber 48 cools down and the steam pressure above the piston 85 decreases. The above steps generate the first steam pressure pulse acted on the comestibles 61 in the dish 64 as shown in FIG. 5a. The steps to produce the second steam pressure pulse includes steps of turning on heater 34 by thermal controller 37, heating the water in the chamber 48 to generate steam, delivering the steam to the extendable arm 12 and applicator 11, covering and sealing the dish 64 as the steam pressure in the extendable arm pushes the piston 85 thus the applicator 11 downwards to the dish, injecting the steam to the comestibles to cook, heat or sterilize the comestibles, releasing excess steam in the dish 64 when the steam pressure therein reaches above a certain pressure, turning off the heater 34 by thermal controller 37, and retracting the applicator from the dish 64 as the water in chamber 48 cools down and the steam pressure above the piston 85 decreases. The third and further steam pressure pulses can be produced by repeating the steps for generating the second steam pressure pulse. Obviously, with second method the chamber 48 needs to be relatively large to contain enough water to produce many pressure pulses or the pressure pulses need to be relatively short.

The third method to generate the steam pressure pulses depicted in FIG. 5a is similar to the second method except that the step of turning off heater 34 by thermal controller 37 is replaced by a step of reducing or stopping the steam flow to the comestibles 61 in the dish 64 by valve 83 and that the step of turning on heater 34 by thermal controller 37 is replaced by a step of increasing or opening the steam flow to the comestibles 61 in the dish 64 by valve 83. The valve 83 may comprise a solenoid valve (not shown) that can be turned on or off electronically, therefore enabling automatic generation of the pressure pulses. The forth method is to periodically move the applicator 11 away from the dish 64. When the applicator 11 is moved up, the dish 64 is open, thus causing the De-pressurization period for the comestibles 61; when the applicator 11 is moved down, the dish is closed, thus causing the pressurization period for the comestibles 61. Such movement of the applicator 11 can be achieved by a solenoid, a motor, or other electromechanical/mechanical means.

The steam pressure pattern of FIG. 5b may be achieved by at least two different methods with the device 10. The first method to generate the steam pressure pulses acted on the comestibles in the dish 64 as depicted in FIG. 5a includes steps of filling the chamber 48 with water from the reservoir 14 through check valve 22, heating the water in the chamber 48 to generate steam, delivering the steam to the extendable arm 12 and applicator 11, covering and sealing the dish 64 as the steam pressure in the extendable arm pushes the piston 85 thus the applicator 11 downwards to the dish, injecting the steam to the comestibles to cook, heat or sterilize the comestibles, releasing excess steam in the dish 64 when the steam pressure therein reaches above a certain pressure, turning off the heater 34 by thermal controller 37 for a brief moment. The above steps covers the Initial heating period and the first steam pressure pulse acted on the comestibles 61 in the dish 64 as shown in FIG. 5b. The steps to produce the second steam pressure pulse includes turning on heater 34 by thermal controller 37 before the pressure in the dish 64 decreases to the certain pressure at which the retraction of the applicator 11 occurs, heating the water in the chamber 48 to generate steam, delivering the steam to the extendable arm 12 and applicator 11, injecting the steam to the comestibles to cook, heat or sterilize the comestibles, releasing excess steam in the dish 64 when the steam pressure therein reaches above a certain pressure, and turning off the heater 34 by thermal controller 37 for a brief moment. The third and further steam pressure pulses can be produced by repeating the steps for generating the second steam pressure pulse. Obviously, in this method the chamber 48 needs to be relatively large to contain enough water to produce many pressure pulses or the pressure pulses need to be relatively short.

The second method to generate the steam pressure pulses depicted in FIG. 5b is similar to the first method except that the step of turning off heater 34 by thermal controller 37 for a brief moment is replaced by a step of reducing or stopping steam flow to the comestibles in dish 64 by valve 83 for a brief moment and that the step of turning on heater 34 by thermal controller 37 before the pressure in dish 64 decreases to the certain pressure at which the retraction of the applicator 11 occurs by a step of increasing or opening steam flow to the comestibles in dish 64 by valve 83 before the pressure in dish 64 decreases to the certain pressure at which the retraction of the applicator 11 occurs. The valve 83 may comprise a solenoid valve (not shown) that can be turned on or off electronically, therefore enabling automatic generation of the pressure pulses.

It should be understood that the pressure pulse curves shown in the FIGS. 5a and 5b are drawn solely for the purpose of understanding the methods of generating the pressure pulses device 10. The shape of these curves, relative size of the various pressures, relative length of the various periods of time, etc. in these pressure pulse curves may not, and are not intended, to represent the pressure pulse curves of any actual device 10. It is also appreciated that the pressure pulses and the breath periods in FIGS. 5a–b may have different lengths or duration if desired.

FIGS. 3a–b show two modified versions for the device 10 of FIG. 1 in which the extendable arm 12 is replaced by a different extendable member, i.e. a flexible or extendable tube 105, with its one end connected to valve 83 and other end to mounting head 73 adapted to connect to applicator inlet 69. To use modified devices of FIGS. 3a or 3b, the user simply moves applicator 11 from its resting position and places it onto the dish 64, i.e. in its operating position as shown in FIGS. 3a–b. Then turn on the steam. The seal between the seal plate 53 and the outer edge 68 of the applicator can be maintained by the weight of the applicator or by some mechanical lock mechanism. The modified applicator of FIG. 3a further has a steam release valve 109 for releasing the steam when the steam pressure in the dish 64 goes above a predetermined pressure. The steam release valve comprises an opening 108 formed on the applicator body 57, a seal disc 109 for normally closing the opening 108 and a keeper 107 for keeping the seal disc in position. It is appreciated that the steam inlet 69 and steam distributor 59 can be located on other parts of applicator 11 and can even be located on dish 64. It is also appreciated that when not in use, the applicator 11 may be stored on top of the reservoir 14 or even be configured to function also as a lid for the reservoir.

The device 10 of FIG. 3a further comprises an air pump 46 and an air conduit 43 for delivering air through the heating channel 33, where the air is heated to a high temperature by heater 34, to applicator 11 and a check valve 50 for preventing steam from entering the air pump. The hot air in the steam increases the heating capacity of the steam and reduces the steam condensation on the comestibles 61 in dish 64. This device allows the delivery of pure hot air under pressure to the applicator 11 to cook or heat the comestibles 61 in the dish when no water is added to the reservoir 14. The pure hot air alone may be delivered to the applicator 11 to heat or cook the comestibles in the dish either continuously or in the form of numerous pressure pulses as shown in FIGS. 5a and 5b. The hot air pressure pulses can be generated by periodically turning off the air pump 46 or by periodically closing the valve 83. The pure hot air or the hot air/steam mixture may also be delivered to the applicator 11 to broil the comestibles 61, to dry the comestibles or to keep the comestibles warm in the dish 64 after the comestibles has been heated or cooked by the steam or steam/hot air mixture.

It is found that the hot air treatment or the hot air in steam can improve the taste, flavor, smell and appearance of the prepared comestibles 61 in dish 64, especially when the comestible is meat. It is also found that the comestibles 61 heated or cooked in the dish 64 by a series of pressure pulses of hot air or hot air/steam mixture according to a pattern similar to that of FIG. 5a or 5b has more uniform quality and tastes better than the comestibles heated or cooked in the dish 64 under constant pressure of hot air or hot air/steam mixture. It is believed that the improved uniformity and taste are caused by the repeated pressurization and de-pressurization of the comestibles 61 during the pressure pulses. The pressurization of the comestibles pushes the fresh hot air or hot air/steam mixture into the interstices and pores in the comestibles, and the de-pressurization pulls the cooled air or hot air/steam mixture out of the interstices and pores, thus causing deeper and more uniform heating and cooking. It is appreciated the air pump 46 and the associated parts can also be applied to the other embodiments of the present invention.

The modified applicator 11 of FIG. 3b further a porous hydrophobic disc 111 mounted into the cavity 72 of the applicator inlet 69 for preventing the liquid water in the chamber 48 from flowing into the dish by gravity and a condensate receiver 20 for receiving the steam condensation formed on the underside surface of the applicator body 57. The porous hydrophobic disc having pores or openings of about 0.0001 mm to 1 mm, preferably from about 0.005 to 0.2 mm in size. The hydrophobic pores in the disc 111 is small enough to prevent gravity flow but large enough to allow both water and steam to pass through them. It is appreciated the disc 111 can also be mounted at the steam inlet 29 in the generator 32 or anywhere between the steam inlet 29 and the steam distributor 59. The condensate receiver 20 is a tunnel or trough along the surrounding edge of the applicator body 57 to catch the steam condensate formed on the inner surface of the applicator body. A condensate chamber 28 is formed on or removably attached to the outer surface of the applicator body 57 to contain the steam condensate and a hole 23 is formed in the applicator body to lead the steam condensate collected in the condensate receiver 20 to the condensate chamber. The hole 23 also allows the steam in the dish to exit at a restricted rate, therefore playing a role controlling the steam pressure above the comestibles 61. A optional plate 86 with openings on it to drain steam condensate on the comestibles 61 is placed on the bottom of the dish. The seal plate 53 of the modified applicator 11 is tilted to help the user to align the seal plate with the rim 68 of the dish 64.

The generator 32 in the modified device of FIG. 3b is mounted on the top of the housing 40 via a flange 115. Unlike in the generator of FIG. 1a or 3a the water inlet to the chamber 48 is closed by check valve 22, in the generator of FIG. 3b the water inlet to the chamber 48 is covered by a lid 135. The user pours water directly into the chamber 48 of the modified generator 32 through the water inlet and closes the water inlet with the lid 135. The lid 135 comprises a gasket 121 for forming a leak-tight seal with the top section 119 of the chamber 48, an pressure indicator 128 for telling the user whether the chamber 48 is under steam pressure and a safety valve 137 for releasing the steam when the steam pressure inside the chamber goes above a predetermined pressure. The indicator has a colored cylinder 129 partially received in a cylindrical opening 131, piston 124 formed below the colored cylinder, a indicator chamber 125 for housing the piston, a spring 127 for pushing the piston and in turn the colored cylinder into the indicator chamber, a diaphragm 123 for conducting the steam pressure to piston 124. When the pressure in chamber 48 increases, the diaphragm pushes the piston, thus the colored cylinder 129, out of the cylindrical opening 131 to indicate to the user that the chamber 48 is under pressure. The safety valve 137 comprises a valve chamber 139, a channel 134 for connecting the valve chamber with the chamber 48, a spring 140 acted on a seal ball 138 in the valve chamber for normally closing channel 134, and a keeper for keeping the spring and ball in the valve chamber. Water outlet 42 and water passageway 17 may be added to the chamber 48 to deliver the hot water to the applicator for direct use or to a coffee or drink cartridge for making liquid comestibles.

It is appreciated that the chamber 48 and the generator 32 of the modified device of FIG. 3b can be made small to facilitate the transportation and storage of the device. A small chamber 48 also allows quick start-up of the device since the heater 34 can quickly heat the small amount of water contained by the small chamber 48. By replacing the applicator 11 here with a foldable applicator, which will be shown in detail in FIGS. 4c–d, the device 10 can be easily packed for travel or vacations. It is also appreciated that the chamber 48 can be made large to contain enough water to make sufficient steam for numerous people. To eliminate the start-up time for steam, the chamber 48 can be controlled at a certain high temperature by the thermal controller such as a thermostat 37 so that there is always pressurized steam in the chamber available when the user(s) want to use the applicator 11. The chamber 48 can be connected to a city water line to be filled with water automatically when the water in the chamber falls below a certain level.

To use the device 10 of FIG. 3b, one fills chamber 48 with water, mounts lid 135, turns on heater 34 and places applicator onto dish 64. The steam can be applied to comestibles 61 in the dish continuously as a plurality of steam pressure pulses according to one of the pressure pulse patterns in FIG. 5a–b. The pressure pulses can be generated by periodically closing valve 83, periodically turning off the power to the heater 34 or by other electromechanical, electronic or thermal means. It is appreciated that the pressure pulses and the breath periods in FIGS. 5a–b may have different lengths or duration.

FIGS. 4a–e show five modified versions of the applicator 11 discussed above. The modified applicator of FIG. 4a has a liquid extractor 146 for extracting the liquid in dish 64. Liquid extractor 146 comprises a liquid container liquid container 149 for containing the liquid and an extraction tube 143 having a liquid inlet 151 at the lower end of the extraction tube, a liquid channel 142 and liquid outlet 145 received in an inlet opening 147 of the liquid container. A filter may be attached to liquid inlet 151 to protect the extraction tube from being clogged by solid comestibles. In use, the pressure above comestibles 61 in dish 64 pushes the liquid in the dish into liquid inlet 151 through channel 142 and into container 149. The extraction tube is sufficiently long to reach near the bottom of dish 64 to allow most of the liquid in the dish to be extracted. The applicator further comprises a skirt 150 for deflecting the hot gaseous fluid such as hot steam or hot air escaped from the seal between the top surface 68 1 of dish 64 and seal surface 52 of the seal plate. It is appreciated that the extraction tube 143 can be attached to liquid container 149 and be removably inserted through an opening on the applicator body 57 into the comestibles 61 in the dish 64.

The modified applicator of FIG. 4b, unlike the applicator 11 of FIG. 1c, does not have outer cylinder 95. It is connected to the generator 32 via an extendable member, in this case a flexible tube 105, to allow a user to cook or heat comestibles 61 by placing the applicator into dish 64 with middle cylindrical body 98 of the applicator resting directly on the side wall of the dish and the bottom of the liquid conduit 93 resting on the bottom of the dish. The liquid conduit 93 should be rigid enough to support the weight of the applicator 11. During, the steam stream or jet from the orifice 62 of the applicator sucks the liquid into the cooking chamber 99 via the conduit 93 and forces the heated or cooked comestibles back into the dish 64 via channel 82. A filter may be located at the inlet 92 to protect the applicator from being clogged by solids, thus allowing the device to heat or cook a mixture of solid and liquid comestibles in the dish 64.

In FIG. 4c, the modified applicator 11 is foldable for facilitating transportation and storage. Two beams 171 are connected to the applicator inlet 69. Two half applicator plates 177a and 177b are connected to beams 171 via foldable connectors such as hinges or flexible diaphragms 112 to allow the folding of the applicator (FIGS. 4e and g). Each half applicator plate 177a or 177b comprises a half applicator body 57a or 57b and a half seal plate 53a or plate 53b around the half applicator body, respectively.

The modified applicator 11 of FIG. 4d is also foldable for facilitating transportation and storage. In this modified applicator, two thin and flexible strips 172 are connected to the applicator inlet 69 and steam distributor 59. The two half applicator plates 177a and 177b are connected to the thin strips 172 to allow the folding of the applicator (FIGS. 4f and h). Each half applicator plate 177a or 177b comprises a half applicator body 57a or 57b and a half seal plate 53a or plate 53b around each half applicator body, respectively. The materials used for the applicator can be transparent to enable the user to view the comestibles 61 during the cooking or heating process. To lower the manufacturing cost, the applicator 11, including the applicator inlet 69, steam distributor 59, half applicator plates 177a and 177b and the thin flexible strip 172, can be injection molded or cast from one material such as an elastomer (silicone, etc.) or plastics. It is appreciated that the applicator body 57 and the seal plate 53 can be made flexible enough to be folded or forced into a small volume, thus eliminating the need for foldable connectors such as the thin strips 172 of FIG. 4d and the hinges or flexible diaphragms 112 of FIG. 4c.

In FIG. 4e the lower surface 52 of seal plate 51, which is simply an extension of the applicator body 57 here, is attached to the to top surface 68 of dish 64 by heat staking or adhesive. One or more weak areas 178, which break to form restrictive vents when the pressure in the dish reaches a certain value, are located on applicator body 57. Applicator inlet 69 is connected to the applicator body. A handle 179 is extended out from seal plate 53 to allow the user to peel off the applicator 11 from dish 64. An amount of comestibles 61, which may be pasteurized, frozen, sterilized, pre-cooked or dried food, is sealed in dish 64 by applicator 11. Applicator inlet 69 may be sealed by a film that can be broken when the inlet 69 is mounted to the mounting head 73 or can peeled of by the user. The applicator body, seal plate and the handle section can be a multi-layer extruded or laminated film or sheet. The applicator body, seal plate and the handle section can also be made by mechanically or thermally forming a plastic sheet or film. To use, a user connects applicator inlet 69 to mounting head 73 and turns on hot gaseous fluid, which pressurizes the dish and breaks weak areas 178 to make restrictive vents. After the comestibles is cooked or heated, the users peel off the applicator to serve or eat the comestibles therein.

The scope of the invention is obviously not restricted or limited in any way to the embodiments described by way of examples and depicted in the drawings, there being numerous changes, modifications, additions, and applications thereof imaginable within the purview of the claims.

What is claimed is:

1. A device for cooking or heating food with hot gaseous fluid directly in a dish comprising:

a generator for producing hot gaseous fluid;

an applicator comprising a generally gas-impermeable body for covering at least part of the dish in which the food is contained, an inlet connected to said generator for receiving the hot gaseous fluid, a seal member having a lower surface adapted to engage with the rim or the side wall of the dish to create a substantially closed cooking chamber for the food in the dish, and a distributor in communication with said inlet for distributing the hot gaseous fluid to the food in the dish; and an arrangement for allowing said applicator to move upwards and downwards during a cooking process from and to the rim of the dish to modulate the cooking pressure for the food in the dish during the cooking process.

2. A device as defined in claim 1 wherein said arrangement allows said applicator to move upwards from the rim of the dish to release hot gaseous fluid when the cooking pressure in the dish reaches above a certain value.

3. A device as defined in claim 1 wherein said arrangement allows said applicator to move repetitively to produce numerous small pressure pulses in the dish.

4. A device as defined in claim 1 wherein said generator is adapted to produce lower steam flow after the food is heated to a desired cooking temperature to reduce steam condensation.

5. A device as defined in claim 1 wherein said generator is adapted to reduce the power to a heater after the food is heated to a desired cooking temperature to save energy.

6. A device as defined in claim 1 further comprising a device to move said applicator up and down relative to the dish during a cooking process to modulate the cooking pressure for the food in the dish.

7. A device as defined in claim 1 wherein said applicator further comprises a skirt spaced apart from the dish.

8. A device as defined in claim 1 further comprising a prevention member in the hot gaseous fluid passageway to prevent the liquid water in said generator from flowing to the food in the dish.

9. A device as defined in claim 8 wherein said member comprises a porous hydrophobic member having hydrophobic pores, said hydrophobic pores being small enough to prevent gravity water flow into the dish.

10. A device as defined in claim 1 wherein said applicator and said arrangement are adapted to allow said applicator to be able to form said closed chamber with various types of dishes commonly available in a household kitchen.

11. A device as defined in claim 1 further comprising conductive heating means for heating the dish.

12. A device as defined in claim 1 wherein said generator is adapted to generate and deliver hot air or hot air/steam mix to heat the food and dish for reducing steam condensation thereon.

13. A method for cooking or heating food with hot gaseous fluid directly in a dish comprising:

placing food directly in a dish having a rim;

engaging the seal member of an applicator with the rim of the dish to form a substantially closed cooking chamber for the food between the dish and applicator;

introducing hot gaseous fluid from a generator through the inlet of the applicator into the cooking chamber to increase the pressure therein to a predetermined pressure;

maintaining the cooking chamber at about the predetermined pressure for a period of time sufficient to complete the cooking of the food in the dish; and superimposing a plurality of pressure pulses upon said predetermined pressure for at least part of said period of time, said plurality of superimposed pressure pulses being adapted to force the hot gaseous fluid into and out of the void spaces in the food repetitively, thereby causing more effective and deeper cooking or heating of the food.

14. A method as defined in claim 14 wherein said step of superimposing pressure pulses comprises repetitive upward and downward movements of the applicator relative the rim of the dish after the pressure in the cooking chamber reaches a predetermined value.

15. A method as defined in claim 14 wherein said step of superimposing pressure pulses comprises repetitively opening and closing the cooking chamber.

16. A method as defined in claim 14 wherein said step of superimposing pressure pulses comprises introducing a hot gaseous fluid in a pulsed fashion to the cooking chamber.

17. A device for cooking or heating food with hot gaseous fluid directly in a dish comprising:

a generator for producing hot gaseous fluid;

an applicator comprising a generally gas-impermeable body for covering at least part of the dish in which the food is contained, an inlet for connecting to said generator to receive the hot gaseous fluid, a seal member having a lower surface adapted to engage with the rim or the side wall of the dish to create a closed cooking chamber for the food in the dish, and a distributor in communication with said inlet for distributing the hot gaseous fluid to the food in the dish; and a mechanism for repetitively opening said cooking chamber to atmosphere to release some of the hot gaseous fluid therein during the cooking process, thereby producing a plurality of pressure pulses to improve the cooking of the food in the dish.

* * * * *